(12) United States Patent  
Chang et al.

(10) Patent No.: US 10,341,557 B2  
(45) Date of Patent: Jul. 2, 2019

(54) IMAGE PROCESSING APPARATUSES AND METHODS

(71) Applicant: Quanta Computer Inc., Taoyuan (TW)

(72) Inventors: Chia-Yuan Chang, Taoyuan (TW); Jung-Wen Chang, Taoyuan (TW); Chien-Hung Lin, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 0 days.

(21) Appl. No.: 15/837,086

(22) Filed: Dec. 11, 2017

(65) Prior Publication Data

US 2019/0109985 A1   Apr. 11, 2019

(30) Foreign Application Priority Data

Oct. 6, 2017   (TW) .............................. 106134509 A (51) Int. Cl.
| | |
|---|---|
| *H04N 5/232* | (2006.01) |
| *H04N 5/247* | (2006.01) |
| *H04N 9/64* | (2006.01) |
| *H04N 9/73* | (2006.01) |
| *H04N 9/74* | (2006.01) |

(52) U.S. Cl.
CPC ..... *H04N 5/23229* (2013.01); *H04N 5/23238* (2013.01); *H04N 5/247* (2013.01); *H04N 9/643* (2013.01); *H04N 9/646* (2013.01); *H04N 9/735* (2013.01); *H04N 9/74* (2013.01)

(58) Field of Classification Search
CPC ........... H04N 5/23229; H04N 5/23238; H04N 5/247; H04N 9/643; H04N 9/46; H04N 9/735; H04N 9/74

USPC .......................................................... 348/38  
See application file for complete search history.

(56) References Cited

U.S. PATENT DOCUMENTS

| | | | | |
|---|---|---|---|---|
| 5,530,441 | A  * | 6/1996 | Takatou ................... | G08G 1/04 340/933 |
| 6,778,207 | B1 * | 8/2004 | Lee ..................... | H04N 5/23238 348/36 |
| 2002/0075258 | A1 * | 6/2002 | Park ....................... | H04N 5/232 345/419 |

(Continued)

FOREIGN PATENT DOCUMENTS

TW    M439803 U1    10/2012

OTHER PUBLICATIONS

Chinese language office action dated Mar. 26, 2018, issued in application No. TW 106134509.

*Primary Examiner* — Nguyen T Truong  
(74) *Attorney, Agent, or Firm* — McClure, Qualey & Rodack, LLP (57) ABSTRACT

An image processing apparatus including a wide-angle camera, an auxiliary camera, and a controller is provided. The wide-angle camera has a first Field Of View (FOV), and captures a first image of a first area of a scene. The auxiliary camera has a second FOV which is narrower than the first FOV, and captures a second image of a second area of the scene. In particular, the wide-angle camera and the auxiliary camera are disposed on the same surface of the image processing apparatus, and synchronized to capture the first image and the second image, respectively. The controller determines a portion of the first image, which corresponds to the second area of the scene, and superimposes the second image on the portion of the first image to generate an enhanced image.

6 Claims, 8 Drawing Sheets

(56) References Cited

U.S. PATENT DOCUMENTS

2002/0180759 A1* 12/2002 Park .................. G06T 3/0012
                                                      345/629

\* cited by examiner

IMAGE PROCESSING APPARATUSES AND METHODS

CROSS REFERENCE TO RELATED APPLICATIONS

This Application claims priority of Taiwan Application No. 106134509, filed on Oct. 6, 2017, and the entirety of which is incorporated by reference herein.

BACKGROUND OF THE APPLICATION

Field of the Application

The application relates generally to image processing techniques, and more particularly, to image processing apparatuses and methods for enhancing wide-angle images.

Description of the Related Art

With the rapid development of imaging technology in recent years, the demand for image-service applications like real-time video streaming (e.g., live streaming) applications and photo-logging/sharing applications has increased significantly. In order to provide image or video content with a wider Field Of View (FOV), more and more users are beginning to prefer wide-angle camera devices, such as panorama cameras or 360-degree cameras.

However, wide-angle camera devices have an inherent limitation: Since limited pixels in the image sensors need to cover a wider part of a scene to render a wide-angle image of the scene, the resolution of the image content will inevitably be reduced.

Therefore, it is desirable to have a solution for improving this limitation on wide-angle camera devices.

BRIEF SUMMARY OF THE APPLICATION

In order to improve the aforementioned limitation on wide-angle camera devices, the present application proposes a dual-camera architecture, in which the image captured by an auxiliary camera is used to enhance the image captured by the wide-angle camera, thereby providing a wide-angle image with a higher definition of a particular subject.

In one aspect of the application, an image processing apparatus comprising a wide-angle camera, an auxiliary camera, and a controller is provided. The wide-angle camera has a first Field Of View (FOV), and is configured to capture a first image of a first area of a scene. The auxiliary camera has a second FOV which is narrower than the first FOV, and is configured to capture a second image of a second area of the scene, wherein the wide-angle camera and the auxiliary camera are disposed on the same surface of the image processing apparatus, and synchronized to capture the first image and the second image, respectively. The controller is configured to determine a portion of the first image, which corresponds to the second area of the scene, and superimpose the second image on the portion of the first image to generate an enhanced image.

In another aspect of the application, an image processing method is provided, which is executed by an image processing apparatus comprising a wide-angle camera having a first FOV and an auxiliary camera having a second FOV which is narrower than the first FOV, wherein the wide-angle camera and the auxiliary camera are disposed on the same surface of the image processing apparatus. The image processing method comprises the steps of: capturing, using the wide-angle camera, a first image of a first area of a scene; capturing, using the auxiliary camera, a second image of a second area of the scene, wherein the wide-angle camera and the auxiliary camera are synchronized to capture the first image and the second image, respectively; determining a portion of the first image, which corresponds to the second area of the scene; and superimposing the second image on the portion of the first image to generate an enhanced image.

Other aspects and features of the application will become apparent to those with ordinary skill in the art upon review of the following descriptions of specific embodiments of the image processing apparatuses and methods.

BRIEF DESCRIPTION OF THE DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
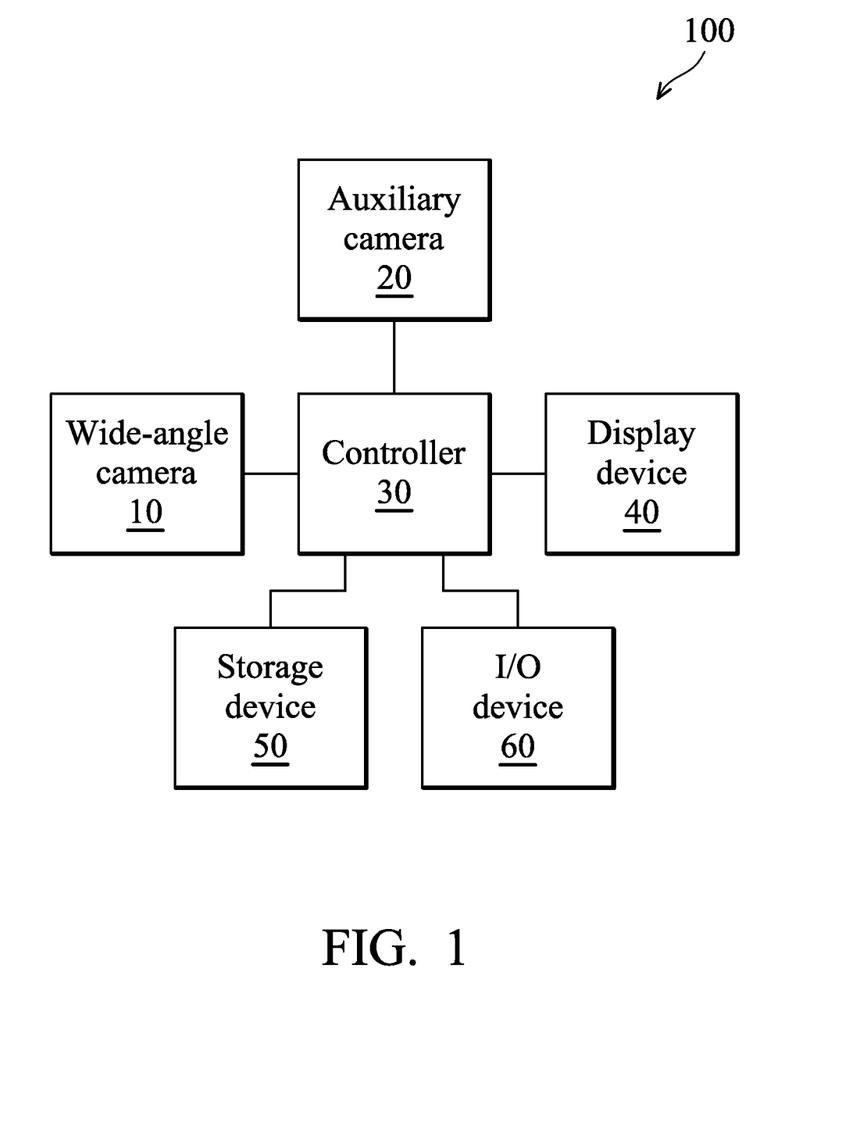
FIG. 1 is a block diagram illustrating the system architecture of an image processing apparatus according to an embodiment of the application.

FIG. 1 is a block diagram illustrating the system architecture of an image processing apparatus according to an embodiment of the application. The image processing apparatus 100 includes a wide-angle camera 10, an auxiliary camera 20, a controller 30, a display device 40, a storage device 50, and an Input/Output (I/O) device 60.

The image processing apparatus 100 may be a hand-held image or video camera, a wearable (e.g., worn on the collar or clipped to clothes, pant, or hat) image or video camera, a web camera (e.g., a surveillance camera), a mobile communication device (e.g., a smartphone or panel Personal Computer (PC)), or a dashboard camera.

The wide-angle camera 10 has a wide FOV and is responsible for capturing images in the wide FOV. In one embodiment, the wide FOV is greater than 180 degrees. The wide-angle camera 10 may include one or more optics, such as see-through lens, and/or image sensors.

The auxiliary camera 20 has a normal or standard FOV and is responsible for capturing images in the normal FOV. Specifically, the wide-angle camera 10 and the auxiliary camera 20 are synchronized to capture images. In one embodiment, the normal FOV is between 60 and 75 degrees. The auxiliary camera 20 may include one or more optics, such as see-through lens, and/or image sensors.

In particular, the wide-angle camera 10 and the auxiliary camera 20 are disposed on the same surface, such as the back surface, front surface, or side surface, of the image processing apparatus 100.

The controller 30 may be a general-purpose processor, Micro-Control Unit (MCU), Digital Signal Processor (DSP), application processor, Graphics Processing Unit (GPU), or Holographic Processing Unit (HPU), or any combination thereof, which includes various circuits for providing the function of data and image processing/computing, sending control signals to the wide-angle camera 10 and the auxiliary camera 20, receiving image data from the wide-angle camera 10 and the auxiliary camera 20, sending a series of frame data (e.g. representing the processed image) to the display device 40, storing and retrieving data to and from the storage device 50, and receiving user input from the I/O device 60 or outputting prompt/feedback signals via the I/O device 60. In particular, the controller 30 coordinates the wide-angle camera 10, the auxiliary camera 20, the display device 40, the storage device 50, and the I/O device 60 for performing the image processing method of the present application.

As will be appreciated by persons skilled in the art, the circuits in the controller 30 will typically comprise transistors that are configured in such a way as to control the operation of the circuitry in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The display device 40 is responsible for displaying visual content or texts, such as the images captured by the wide-angle camera 10 and the auxiliary camera 20, and/or the processed image generated by the controller 30.

The display device 40 may be a Liquid-Crystal Display (LCD), Light-Emitting Diode (LED) display, Organic LED (OLED) display, Electronic Paper Display (EPD), or Cathode Ray Tube (CRT) display, etc. In one embodiment, the display device 40 may further include one or more touch sensors disposed thereon or thereunder for sensing touches, contacts, or approximations of objects, such as fingers or styluses, enabling the display device 40 to serve as an input device.

The storage device 50 is a non-transitory machine-readable storage medium, including a memory, such as a FLASH memory or a Non-volatile Random Access Memory (NVRAM), or a magnetic storage device, such as a hard disk or a magnetic tape, or an optical disc, or any combination thereof for storing frame/image data and instructions or program code of communication protocols, applications, and/or the image processing method of the present application.

The I/O device 60 may include one or more buttons, a keyboard, a mouse, a touch pad, a microphone, a speaker, and/or a light device, etc., serving as the Man-Machine Interface (MMI) for receiving user inputs and/or outputting prompt/feedback signals.

It should be understood that the components described in the embodiment of FIG. 1 are for illustrative purposes only and are not intended to limit the scope of the application. For example, the image processing apparatus 100 may not include one or some of the components in FIG. 1, such as the display device 40. Alternatively, the image processing apparatus 100 may include additional components, such as a power supply, an ambient light sensor, a Global Positioning System (GPS) device, and/or a wireless communication device, wherein the power supply may be a mobile/replaceable battery providing power to all the other components of the image processing apparatus 100, the ambient light sensor may detect the lighting condition of the surrounding environment, the GPS device may provide position information of the image processing apparatus 100 for use of some location-based services or applications, and the wireless communication device may include a Bluetooth or Wireless-Fidelity (WiFi) chipset enabling short-range wireless communications with other mobile communication devices, such as smartphones or panel PCs.

Figure 2A:
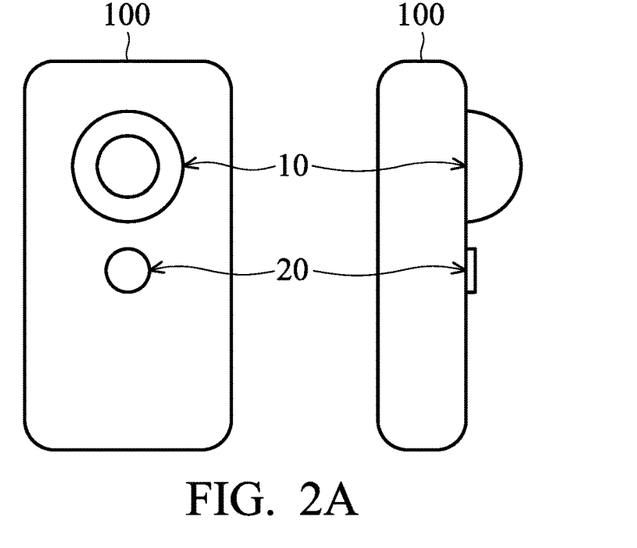
FIGS. 2A and 2B are illustrative embodiments of vertical dispositions of the wide-angle camera 10 and the auxiliary camera 20 on the front or back surface of the image processing apparatus 100.
Figure 2B:
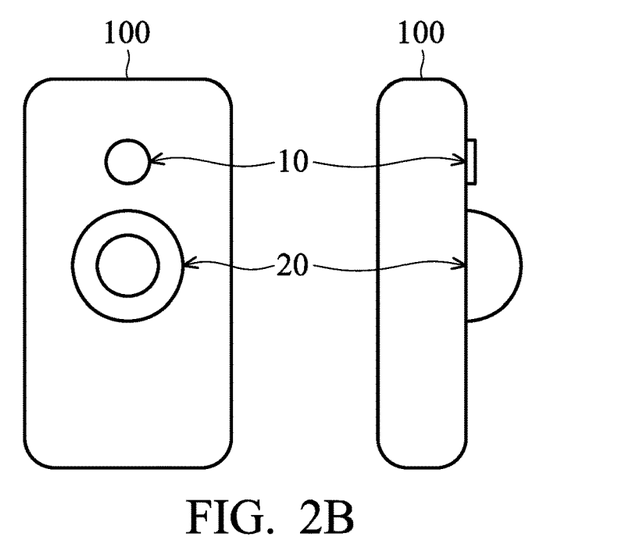

FIGS. 2A and 2B are illustrative embodiments of vertical dispositions of the wide-angle camera 10 and the auxiliary camera 20 on the front or back surface of the image processing apparatus 100. As shown in FIGS. 2A and 2B (on the left is the front or back view of the image processing apparatus 100, on the right is the side view of the image processing apparatus 100), both the wide-angle camera 10 and the auxiliary camera 20 are disposed on the front or back surface of the image processing apparatus 100, while the display device 40 may be disposed at the opposite surface of the image processing apparatus 100. The rest components of the image processing apparatus 100 may be disposed in the image processing apparatus 100. The auxiliary camera 20 may be disposed in a position close to and lower than the wide-angle camera 10, as shown in FIG. 2A. Alternatively, the auxiliary camera 20 may be disposed in a position close to and higher than the wide-angle camera 10, as shown in FIG. 2B.

Figure 3A:
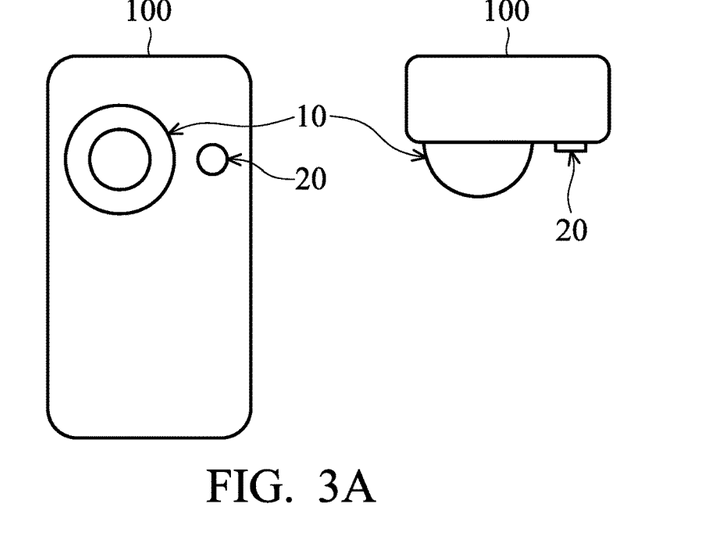
FIGS. 3A and 3B are illustrative embodiments of parallel dispositions of the wide-angle camera 10 and the auxiliary camera 20 on the front or back surface of the image processing apparatus 100.
Figure 3B:
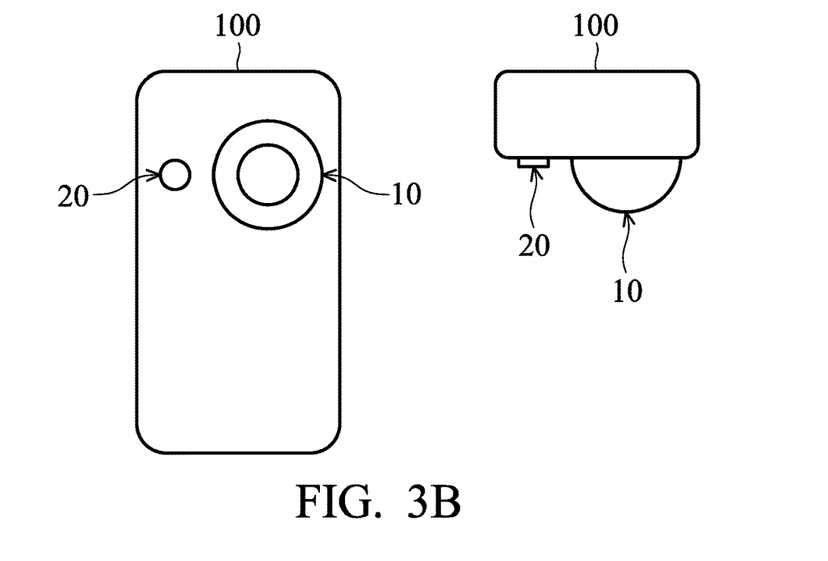

FIGS. 3A and 3B are illustrative embodiments of parallel dispositions of the wide-angle camera 10 and the auxiliary camera 20 on the front or back surface of the image processing apparatus 100. As shown in FIGS. 3A and 3B (on the left is the front or back view of the image processing apparatus 100, on the right is the side view of the image processing apparatus 100), both the wide-angle camera 10 and the auxiliary camera 20 are disposed on the front or back surface of the image processing apparatus 100, while the display device 40 may be disposed at the opposite surface of the image processing apparatus 100. The rest components of the image processing apparatus 100 may be disposed in the image processing apparatus 100. The auxiliary camera 20 may be disposed adjacently to the right of the wide-angle camera 10, as shown in FIG. 3A. Alternatively, the auxiliary camera 20 may be disposed adjacently to the left of the wide-angle camera 10, as shown in FIG. 3B.

Figure 4:
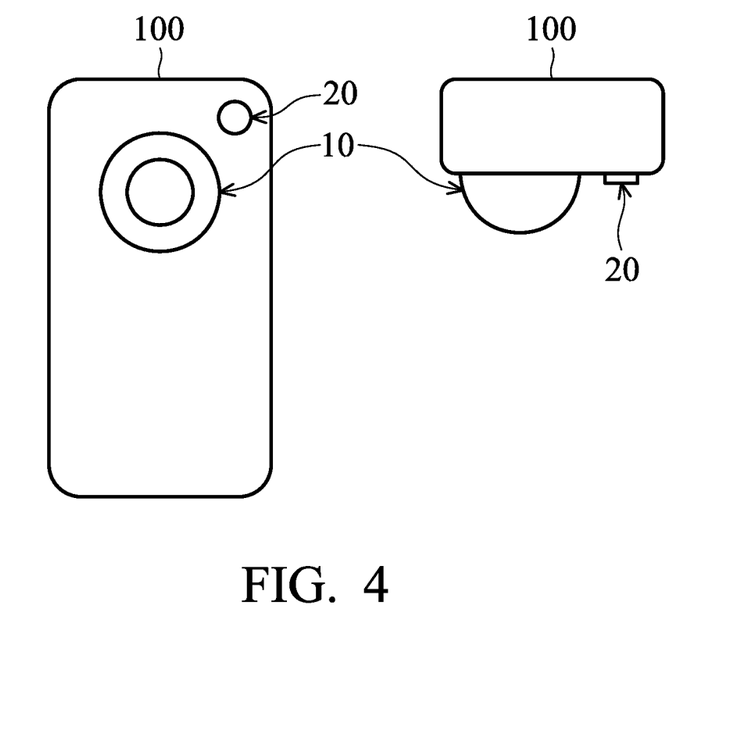
FIG. 4 is an illustrative embodiment of diagonal dispositions of the wide-angle camera 10 and the auxiliary camera 20 on the front or back surface of the image processing apparatus 100.

FIG. 4 is an illustrative embodiment of diagonal dispositions of the wide-angle camera 10 and the auxiliary camera 20 on the front or back surface of the image processing apparatus 100. As shown in FIG. 4 (on the left is the front or back view of the image processing apparatus 100, on the right is the side view of the image processing apparatus 100), both the wide-angle camera 10 and the auxiliary camera 20 are disposed on the front or back surface of the image processing apparatus 100, while the display device 40 may be disposed at the opposite surface of the image processing apparatus 100. The rest components of the image processing apparatus 100 may be disposed in the image processing apparatus 100. The auxiliary camera 20 may be disposed adjacently to the upper right of the wide-angle camera 10, as shown in FIG. 4. Alternatively, the auxiliary camera 20 may be disposed adjacently to the upper left, lower right, or lower left of the wide-angle camera 10, and the application should not be limited thereto.

Figure 5:
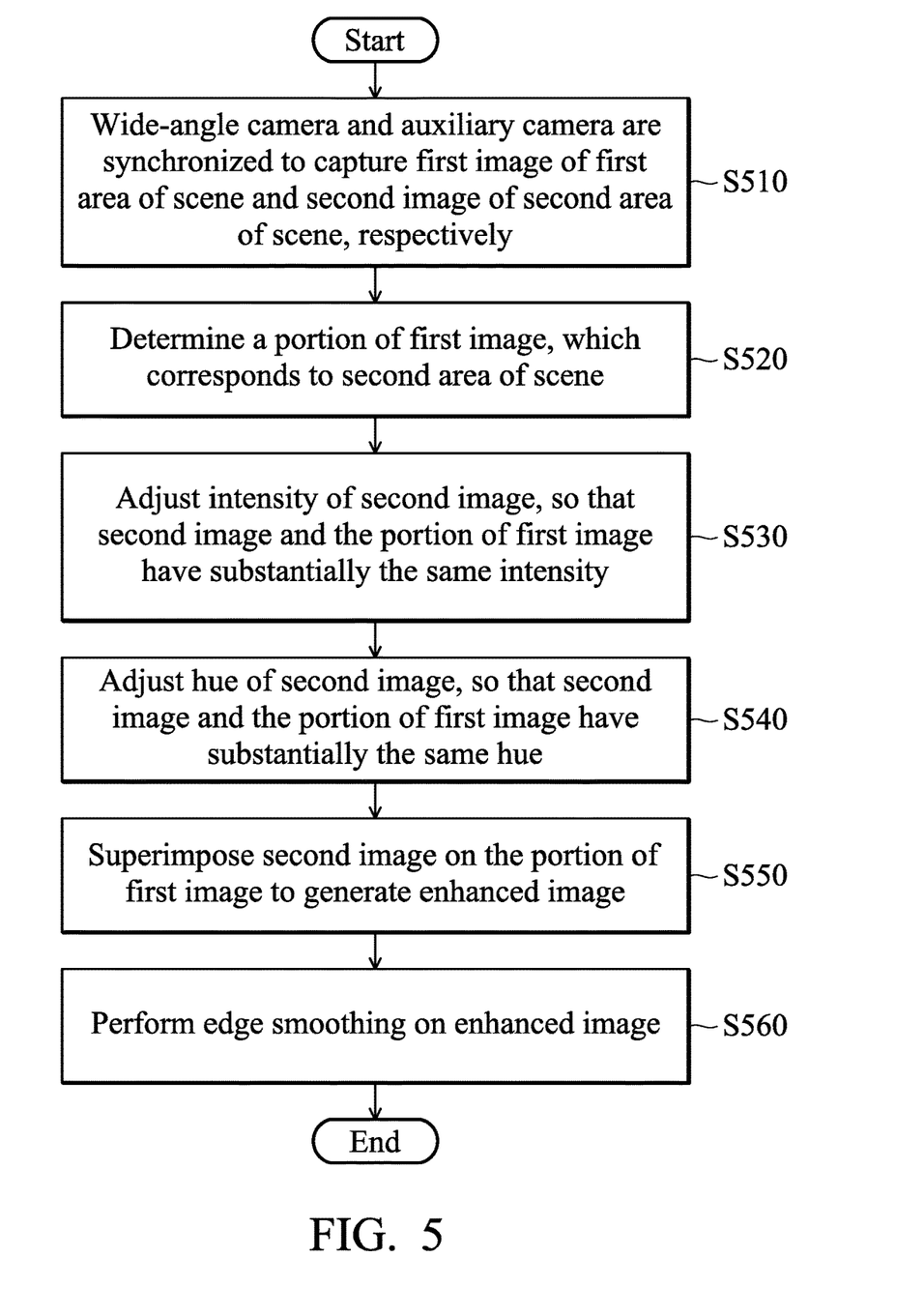
FIG. 5 is a flow chart illustrating the image processing method according to an embodiment of the present application.

FIG. 5 is a flow chart illustrating the image processing method according to an embodiment of the present application. In this embodiment, the image processing method is executed by an image processing apparatus (e.g., the image processing apparatus 100) which include a wide-angle camera (e.g., the wide-angle camera 10) and an auxiliary camera (e.g., the auxiliary camera 20).

To further clarify, the image processing method may be implemented as a software module consisting of program code which is loaded and executed by a controller of the image processing apparatus.

To begin, the wide-angle camera and the auxiliary camera are synchronized to capture a first image of a first area of a scene and a second image of a second area of the scene, respectively (step S510). Specifically, the wide-angle camera has a first FOV, while the auxiliary camera has a second FOV that is narrower than the first FOV. In a preferred embodiment, the first area is greater than the second area, and the first area includes the second area. That is, the first image covers a wider area of the scene than the second image.

Subsequently, the image processing apparatus determines a portion of the first image, which corresponds to the second area of the scene (step S520). Specifically, the image processing apparatus may analyze the first and second images to find out the keypoints of each image, including edges, corners, and/or blobs in each image, and then extract the features, including global features, local features, and/or correlation features, of each keypoint. For example, features of a keypoint may include the position, geometry, color, contrast, and/or texture of the keypoint. After feature extraction, the image processing apparatus may perform feature matching on the features of the two images, to determine the portion of the first image, which corresponds to the second area of the scene.

Subsequent to step S520, the image processing apparatus adjusts the intensity of the second image, so that the second image and the portion of the first image have substantially the same (i.e., the same or approximate) intensity (step S530).

Subsequent to step S530, the image processing apparatus adjusts the hue of the second image, so that the second image and the portion of the first image have substantially the same (i.e., the same or approximate) hue (step S540).

It should be understood that the precedence of steps S530 and 540 may not swapped. That is, the hue adjustment may be performed prior to the intensity adjustment. In addition, steps S530 and 540 may be optional, i.e., one or both of steps S530 and 540 may be skipped if the intensity and/or hue of the second image is already the same with or approximate to the intensity and/or hue of the portion of the first image.

After adjusting the intensity and hue of the second image, the image processing apparatus superimposes the second image on the portion of the first image to generate an enhanced image (step S550).

Lastly, the image processing apparatus performs edge smoothing on the enhanced image (step S560), and the method ends. Specifically, the edge smoothing is performed to smooth the edge of a portion of the enhanced image, where the second image was superimposed on the first image.

Figure 6A:
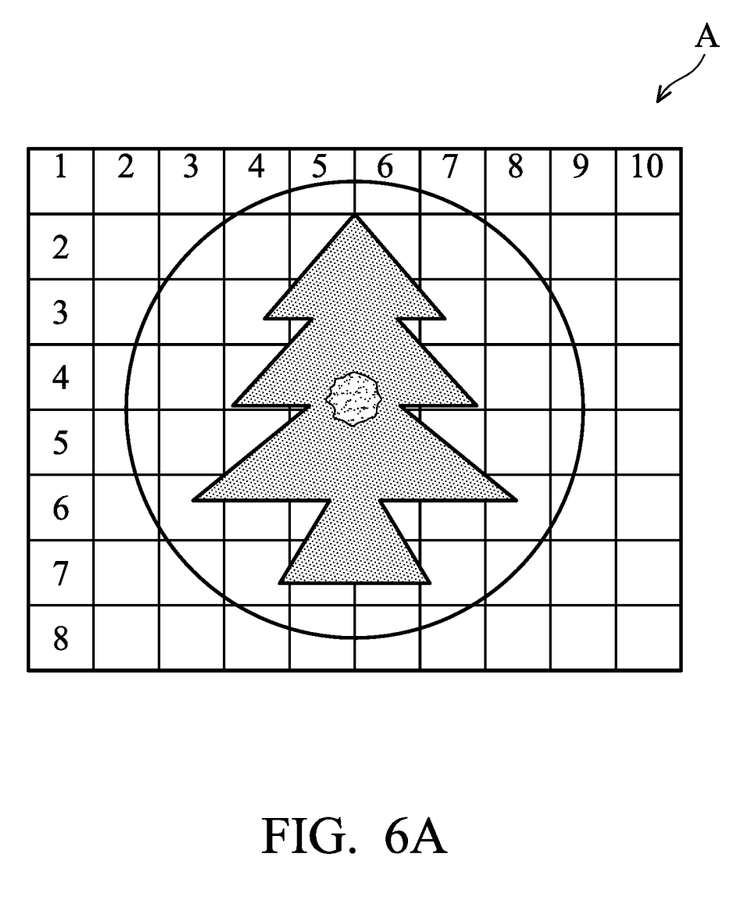
FIGS. 6A to 6C are schematic diagrams illustrating image processing according to an embodiment of the application.
Figure 6B:
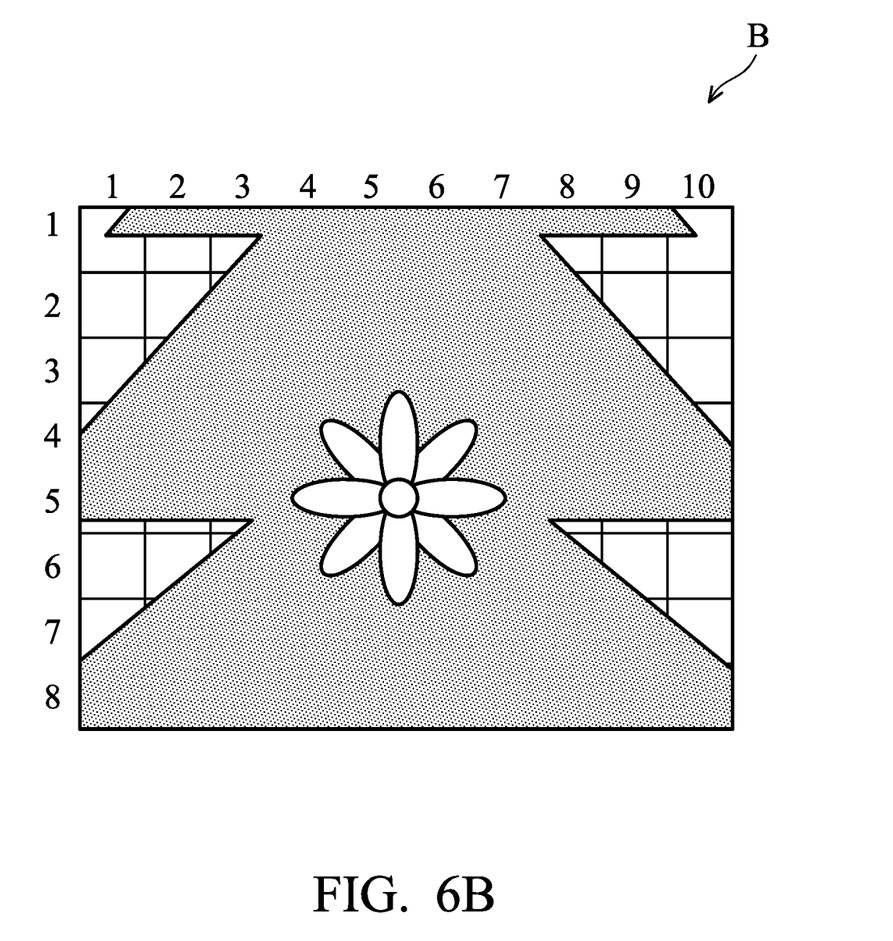
Figure 6C:
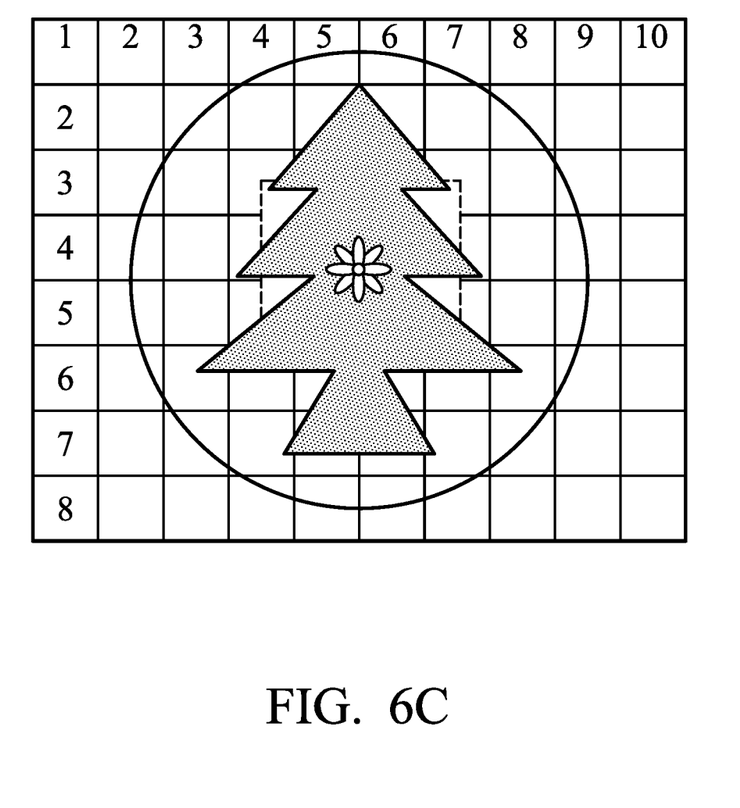

FIGS. 6A to 6C are schematic diagrams illustrating image processing according to an embodiment of the application. FIG. 6A shows the image captured by the wide-angle camera 10. FIG. 6B shows the image captured by the auxiliary camera 20. FIG. 6C shows the enhanced image.

As shown in FIG. 6A, the wide-angle camera 10 is able to capture the image (denoted as A) of the entire tree due to the wide-angle camera 10 having a wide FOV. By contrast, the auxiliary camera 20 is only able to capture the image (denoted as B) of a part of the tree due to the auxiliary camera 20 having a medium FOV, as shown in FIG. 6B.

In this embodiment, the image sensors of the wide-angle camera 10 and the auxiliary camera 20 have the same pixel size, and thus, image B has a higher resolution than image A, regarding the image of the part of the tree. Referring back to FIGS. 6A and 6B, image B clearly shows that the object at the center of the tree is a flower, while image A only shows that there's a blurry thing at the center of the tree and it's hard to tell what the blurry thing is.

By applying the image processing method of the application to the exemplary scenario as demonstrated in FIGS. 6A and 6B, the image processing apparatus may first determine the portion of image A, which covers the same part of the tree as image B does, and then superimpose image B on the determined portion of image A to generate an enhanced image. As shown in FIG. 6C, the enhanced image not only shows the entire tree, but also shows the center of the tree with more and clearer details.

In another embodiment, the image sensors of the wide-angle camera 10 and the auxiliary camera 20 may have different pixel sizes, as long as the auxiliary camera 20 may capture more and clearer details of a particular area of the scene (e.g., center part of the tree) than the wide-angle camera 10, and the application should not be limited thereto.

It should be understood that, when the user browses the captured images, the image processing apparatus may display the first image (i.e., the image captured by the wide-angle camera 10). After that, when the user enlarges (zoom in) the displayed image, the image processing apparatus may display the enhanced image scaled according to the zoom-in configuration. Conventionally, the zoom-in effect on the image captured by a wide-angle camera can only be achieved by scaling the image using interpolation techniques. However, so-called mosaics are very likely to appear in the scaled image using interpolation techniques. By contrast, in the present application, the image of the subject is enhanced by the second image (i.e., the image captured by the auxiliary camera 20) which have more and clearer details of the subject.

In view of the forgoing embodiments, it will be appreciated that the present application realizes enhancement of image displays, by introducing an auxiliary camera synchronized with the wide-angle camera to capture an additional image for providing more and clearer details of the subject to enhance the wide-angle image. Advantageously, the image captured and presented by the image processing apparatus may satisfy both the demand for wide-angle images and the demand for higher definition of the subject.

While the application has been described by way of example and in terms of preferred embodiment, it should be understood that the application cannot be limited thereto.

Those who are skilled in this technology can still make various alterations and modifications without departing from the scope and spirit of this application. Therefore, the scope of the present application shall be defined and protected by the following claims and their equivalents.

Note that use of ordinal terms such as "first", "second", etc., in the claims to modify a claim element does not by itself connote any priority, precedence, or order of one claim element over another or the temporal order in which acts of the method are performed, but are used merely as labels to distinguish one claim element having a certain name from another element having the same name (except for use of ordinal terms), to distinguish the claim elements.

What is claimed is:

1. A mobile device, comprising:
   a wide-angle camera, having a first Field Of View (FOV), configured to capture a first image of a first area of a scene;
   an auxiliary camera, having a second FOV which is narrower than the first FOV, configured to capture a second image of a second area of the scene,
   wherein the wide-angle camera and the auxiliary camera are disposed on the same surface of the image processing apparatus, and synchronized to capture the first image and the second image, respectively, and
   wherein the first image in the area has a first resolution and the second image has a second resolution which is higher than the first resolution, and the first FOV is greater than 180 degrees, and the second FOV is between 60 and 75 degrees; and
   a controller, configured to determine a portion of the first image, which corresponds to the second area of the scene, and superimpose the second image on the portion of the first image to generate an enhanced image.

2. The mobile device of claim 1, wherein, prior to superimposing the second image on the portion of the first image, the controller is further configured to adjust intensity and hue of the second image.

3. The mobile device of claim 1, wherein the controller is further configured to perform edge smoothing on the enhanced image.

4. An image processing method, executed by a mobile device comprising a wide-angle camera having a first FOV and an auxiliary camera having a second FOV which is narrower than the first FOV, wherein the wide-angle camera and the auxiliary camera are disposed on the same surface of the mobile device, the image processing method comprising:
   capturing, using the wide-angle camera, a first image of a first area of a scene;
   capturing, using the auxiliary camera, a second image of a second area of the scene, wherein the wide-angle camera and the auxiliary camera are synchronized to capture the first image and the second image, respectively, and
   wherein the first image in the area has a first resolution and the second image has a second resolution which is higher than the first resolution, and the first FOV is greater than 180 degrees, and the second FOV is between 60 and 75 degrees;
   determining a portion of the first image, which corresponds to the second area of the scene; and
   superimposing the second image on the portion of the first image to generate an enhanced image.

5. The image processing method of claim 4, further comprising:
   prior to superimposing the second image on the first image, adjusting intensity and hue of the second image.

6. The image processing method of claim 4, further comprising:
   performing edge smoothing on the enhanced image.

* * * * *